(12) United States Patent
Okamoto et al.

(10) Patent No.: US 7,319,534 B2
(45) Date of Patent: Jan. 15, 2008

(54) IMAGE FORMING APPARATUS CAPABLE OF OUTPUTTING A CONFIRMATION COPY OF AT LEAST ONE INDIVIDUALLY SELECTED SHEET OF A PLURALITY OF SHEETS OF A COPY TO BE MADE, AND METHOD CORRESPONDING THERETO

(75) Inventors: Akira Okamoto, Hachioji (JP); Satoshi Sakata, Hachioji (JP)

(73) Assignee: Konica Corporation, Tokyo (JP)

( * ) Notice: Subject to any disclaimer, the term of this patent is extended or adjusted under 35 U.S.C. 154(b) by 721 days.

(21) Appl. No.: 10/353,879

(22) Filed: Jan. 29, 2003

(65) Prior Publication Data
US 2003/0147093 A1    Aug. 7, 2003

(30) Foreign Application Priority Data
Feb. 7, 2002    (JP) .............................. 2002-031046

(51) Int. Cl.
*G06F 3/12*    (2006.01)
*G06F 15/00*    (2006.01)

(52) U.S. Cl. ...................................... 358/1.13; 358/1.1

(58) Field of Classification Search ......... 358/1.1–1.18
See application file for complete search history.

(56) References Cited

U.S. PATENT DOCUMENTS

| | | | | |
|---|---|---|---|---|
| 6,471,424 B1* | 10/2002 | Hirose | ......................... | 400/282 |
| 6,512,899 B2* | 1/2003 | Shimada et al. | .............. | 399/82 |
| 6,773,176 B2* | 8/2004 | Kurosawa | ..................... | 400/76 |

* cited by examiner

*Primary Examiner*—Douglas Q. Tran
(74) *Attorney, Agent, or Firm*—Frishauf, Holtz, Goodman & Chick, P.C.

(57) ABSTRACT

An image forming apparatus and an image forming method capable of reducing a waste of papers, and confirming contents of a plurality of copies of images, when outputting the copies of images. The image forming apparatus has: a one-sheet output mode instructing section for instructing a one-sheet output mode for outputting one copy of images as a confirmation for every sheet, when outputting a plurality of copies of images formed on the basis of inputted image data; and a one-sheet output control section for outputting the one copy of images as the confirmation for every sheet, when the one-sheet output mode is instructed by the one-sheet output mode instructing section.

21 Claims, 4 Drawing Sheets

IMAGE FORMING APPARATUS CAPABLE OF OUTPUTTING A CONFIRMATION COPY OF AT LEAST ONE INDIVIDUALLY SELECTED SHEET OF A PLURALITY OF SHEETS OF A COPY TO BE MADE, AND METHOD CORRESPONDING THERETO

BACKGROUND OF THE INVENTION

1. Field of the Invention

The invention relates to an image forming apparatus and an image forming method, and in particular to control of an operation in a confirmation output mode when outputting a plurality of copies of papers.

2. Description of Related Art

Conventionally, some image forming apparatuses such as a digital copying machine or the like, comprise confirmation output modes for outputting one copy of papers as a confirmation, when instructed by users or the like to output a plurality of copies of papers.

When the user makes the image forming apparatus the confirmation output mode, the image forming apparatus outputs only one copy of papers. Then, when the user confirms contents of the copy of papers outputted from the image forming apparatus, the user can make the image forming apparatus output desired copies of papers. Therefore, it has been possible to prevent the image forming apparatus from outputting a large number of copies of papers by mistake, and wasting papers.

However, in the above-described confirmation output mode, when the user makes the image forming apparatus the confirmation output mode, the image forming apparatus outputs all pages of the copy of papers as the confirmation. Therefore, even when it becomes clear that there is some mistakes in any page, or the user wants to confirm only a specified page, all the pages of the copy of papers are outputted. As a result, in case the number of one copy of papers is large, a large number of papers are wasted.

SUMMARY OF THE INVENTION

The present invention was developed in view of the above-described problems.

It is an object of the present invention to provide an image forming apparatus and an image forming method capable of reducing a waste of papers, and confirming contents of a plurality of copies of images, when outputting the copies of images.

In order to solve the above-described object, in accordance with a first aspect of the present invention, an image forming apparatus comprises: a one-sheet output mode instructing section for instructing a one-sheet output mode for outputting one copy of images as a confirmation for every sheet, when outputting a plurality of copies of images formed on the basis of inputted image data; and a one-sheet output control section for outputting the one copy of images as the confirmation for every sheet, when the one-sheet output mode is instructed by the one-sheet output mode instructing section.

According to the apparatus of the first aspect of the present invention, it is possible to instruct the one-sheet output mode for outputting one copy of images as the confirmation for every sheet, by the one-sheet output mode instructing section, and to output the one copy of images as the confirmation for every sheet, on the basis of the one-sheet output mode instructed by the one-sheet output mode instructing section, by the one-sheet output control section.

Consequently, because it is needless to output all the one copy of images as the confirmation, it is possible to reduce the waste of papers more.

Preferably, in the apparatus of the first aspect of the present invention, the one-sheet output control section outputs the one copy of images as the confirmation in page order, for every sheet.

According to the above-described apparatus, it is needless to say to obtain the same effect as the apparatus of the first aspect of the present invention. Specially, because the one copy of images as the confirmation are outputted in page order by the one-sheet output control section, it is possible to confirm the images in page order, for every sheet.

Preferably, in the apparatus of the first aspect of the present invention, the one-sheet output control section outputs a page selected from the one copy of images as the confirmation for every sheet.

According to the above-described apparatus, it is needless to say to obtain the same effect as the apparatus of the first aspect of the present invention. Specially, because the page selected from the one copy of images as the confirmation is outputted for every sheet by the one-sheet output control section, it is possible to output the image of only the desired page.

More preferably, the above-described apparatus, further comprises: a first operation display; and a page number display control section for displaying page numbers corresponding to a number of sheets of the one copy of images to be outputted, on the first operation display, when the one-sheet output mode is instructed by the one-sheet output mode instructing section, wherein the one-sheet output control section outputs an image of a page of the one copy of images as the confirmation, the page having a page number selected from the page numbers displayed on the first operation display. Further, the first operation display may comprise a liquid crystal display.

According to the above-described apparatus, it is needless to say to obtain the same effect as described above. Specially, because the page numbers corresponding to the number of sheets of the one copy of images to be outputted, are displayed on the first operation display, by the page number display control section, when the one-sheet output mode is instructed, it is possible that the user specifies the page to be outputted as the confirmation by selecting any one of the page numbers displayed on the first operation display. Further, because the image of the page selected from the one copy of images as the confirmation is outputted by the one-sheet output control section, it is possible to output only the page which the user wants to confirm, and to provide the apparatus which the user can use easily, for the user.

Preferably, the apparatus of the first aspect of the present invention, further comprises: an output mode selecting section for selecting any one of an order output mode for outputting the one copy of images as the confirmation in page order, and a selection output mode for outputting an image of a page selected from the one copy of images as the confirmation, when the one-sheet output mode is instructed by the one-sheet output mode instructing section, wherein the one-sheet output control section outputs the one copy of images as the confirmation in page order when the order output mode is selected by the output mode selecting section, or outputs the image of the page selected from the one copy of images as the confirmation when the selection output mode is selected by the output mode selecting section.

According to the above-described apparatus, it is needless to say to obtain the same effect as the apparatus of the first aspect of the present invention. Specially, it is possible to select any one of the order output mode for outputting the one copy of images as the confirmation in page order, and the selection output mode for outputting the image of the page selected from the one copy of images as the confirmation, by the output mode selecting section, and to output the one copy of images as the confirmation according to the selected output mode, by the one-sheet output control section. Consequently, it is possible to provide the output format with the object of the user, for the user.

Preferably, the apparatus of the first aspect of the present invention, further comprises: a display; a predetermined condition display control section for displaying a predetermined condition display screen for determining to go on to output predetermined copies of images or to change outputting the predetermined copies of images, on the display, when the one-sheet output control section outputs all the one copy of images; and an executive section for going on to output the predetermined copies of images, or changing outputting the predetermined copies of images, according to a predetermined condition on the predetermined condition display screen.

According to the above-described apparatus, it is needless to say to obtain the same effect as the apparatus of the first aspect of the present invention. Specially, because the predetermined condition display screen for determining to go on to output predetermined copies of images or change outputting the predetermined copies of images is displayed on the display, when all the one copy of images as the confirmation are outputted, by the predetermined condition display control section, and the output of the predetermined copies of images are gone on or changed according to the predetermined condition, by the executive section, it is possible to simplify the operation for determining the condition, performed by the user, after the copy of images as the confirmation are outputted.

More preferably, the above-described apparatus further comprises: an instruction display screen changing section for displaying the predetermined condition display screen on the display, while outputting the one copy of images as the confirmation.

According to the above-described apparatus, it is needless to say to obtain the same effect as described above. Specifically, because the predetermined condition display screen can be displayed on the display, while outputting the one copy of images as the confirmation, by the instruction display screen changing section, it is possible to stop outputting the one copy of images as the confirmation, and start the original output processing or the original changing processing quickly.

Preferably, the apparatus of the first aspect of the present invention, further comprises: an output start button for starting outputting the one copy of images, wherein the one-sheet output control section outputs the one copy of images as the confirmation for every sheet, even when the output start button is pushed.

According to the above-described apparatus, it is needless to say to obtain the same effect as the apparatus of the first aspect of the present invention. Specifically, because the one copy of images as the confirmation are outputted for every sheet by the one-sheet output control section, even when the output start button is pushed, it is possible to instruct to output the one copy of images as the confirmation when the user pushes the output start button. Consequently, it is possible to easily realize that the one copy of images are outputted so as to be confirmed for every sheet.

Preferably, the apparatus of the first aspect of the present invention, further comprises: a staple mode selecting section for determining a staple mode; and a staple mode releasing section for releasing the staple mode, while being in the one-sheet output mode, or outputting the one copy of images as the confirmation, when the staple mode is determined by the staple mode selecting section, and the one-sheet output mode is instructed by the one-sheet output mode instructing section.

According to the above-described apparatus, it is needless to say to obtain the same effect as the apparatus of the first aspect of the present invention. Specifically, the staple mode is released by the staple mode releasing section, while being in the one-sheet output mode, or outputting the one copy of images as the confirmation, when the staple mode and the one-sheet output mode are instructed by the user. Consequently, it is possible to prevent from stapling the copy for every sheet.

More preferably, the above-described apparatus further comprises: a second operation display; and a release confirmation display control section for displaying an operation for confirming that the staple mode is released, on the second operation display, when the one-sheet output mode is instructed by the one-sheet output mode instructing section, wherein the staple mode releasing section releases the staple mode, on the basis of the operation for confirming that the staple mode is released, displayed on the second operation display. Further, the second operation display may comprise a liquid crystal display.

According to the above-described apparatus, it is needless to say to obtain the same effect as described above. Specially, because the operation for confirming that the staple mode is released is displayed on the second operation display, by the release confirmation display control section, it is possible to inform the user that the staple mode is released. Consequently, it is possible to provide the apparatus which the user can use easily, for the user.

In accordance with a second aspect of the present invention, an image forming method comprises: instructing a one-sheet output mode for outputting one copy of images as a confirmation for every sheet, when outputting a plurality of copies of images formed on the basis of inputted image data; and outputting the one copy of images as the confirmation for every sheet, when the one-sheet output mode is instructed.

BRIEF DESCRIPTION OF THE DRAWINGS

The present invention will become more fully understood from the detailed description given hereinafter and the accompanying drawing given by way of illustration only, and thus are not intended as a definition of the limits of the present invention, and wherein.

PREFERRED EMBODIMENTS OF THE INVENTION

Hereinafter, a preferred embodiment of the present invention will be explained with reference to figures.

First, a structure of an image forming apparatus 1 according to a preferred embodiment of the present invention, will explained as follows.

Figure 1:
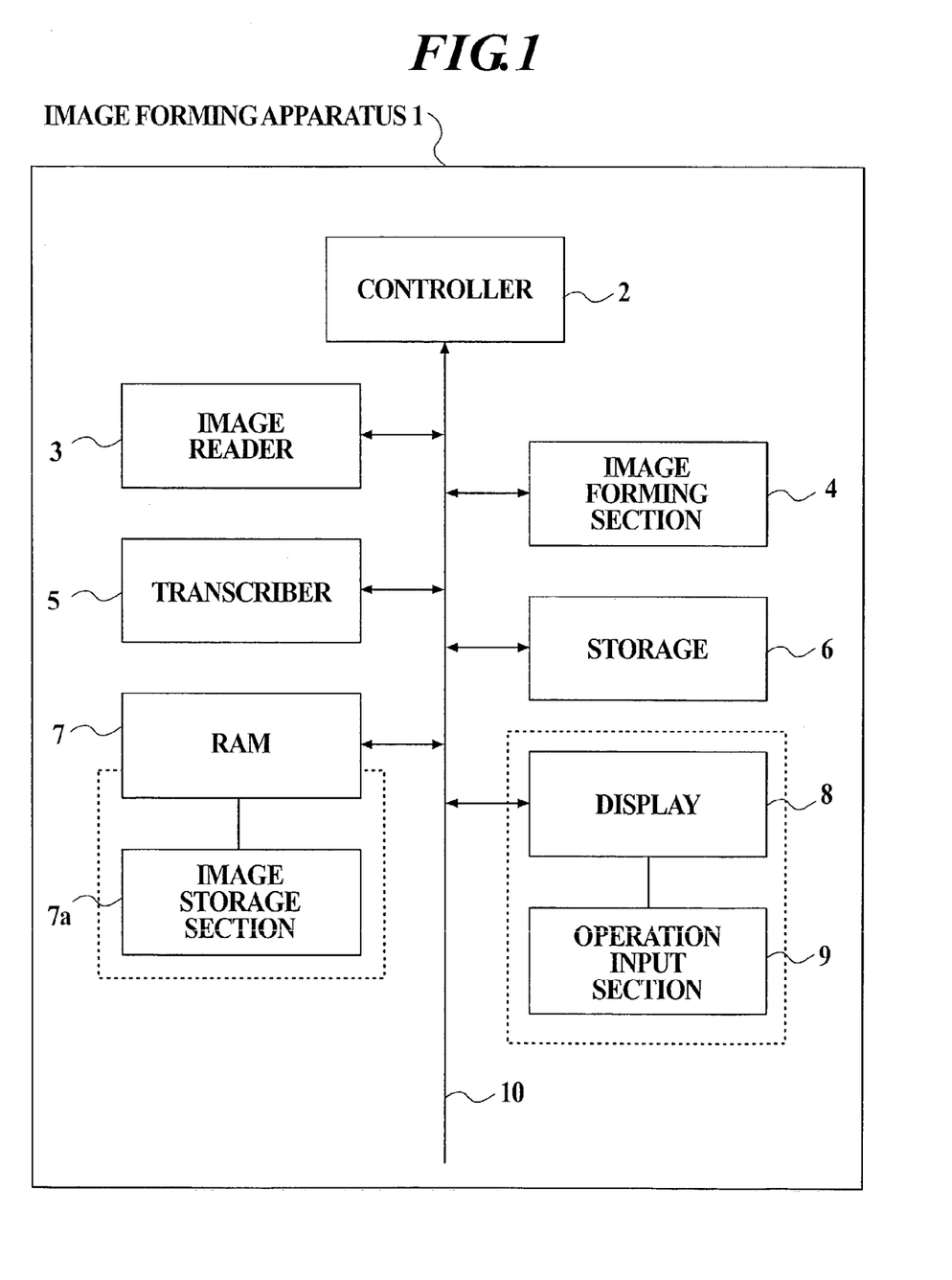
FIG. 1 is a block diagram for explaining an internal structure of an image forming apparatus 1 of the present invention.

FIG. 1 is a block diagram showing an internal structure of the image forming apparatus 1.

The image forming apparatus 1 shown in FIG. 1 is used as, for example, a copying machine, a printer, a MFP (Multifunction Peripheral), a printing machine, a printer information providing terminal (for example, a kiosk terminal), or the like. As shown in FIG. 1, the image forming apparatus 1 comprises a controller 2, an image reader 3, an image forming section 4, a transcriber 5, a storage 6, a RAM 7, a display 8 and an operation input section 9 as one with the display 8, which are connected to each other through a bus 10.

The controller 2 consists of a CPU (Central Processing Unit) or the like. The controller 2 develops a program specified from a system program stored in the storage 6, and various types application programs regarding the image formation, in a work area of the RAM 7, which is not shown in figures, and performs various processing according to the program corresponding to data inputted through each section such as the operation input section 9 or the like. Then, the controller 2 stores results of the processing in the RAM 7, displays it on the display 8, and stores it in a predetermined area of the storage 6. More specifically, the control 2 reads an image output processing program stored in the storage 6, and performs an image output processing according to the image output processing program.

The controller 2 outputs an instruction signal to the image reader 3, the image forming section 4, the transcriber 5 or the like, on the basis of an input signal inputted through the operation input section 9 by the user, and makes them output image data specified by the user in the image output condition specified by the user, according to the image output processing. More specifically, when the user pushes a confirmation output mode button 9a (shown in FIG. 3) of the operation input section 9, the controller 2 controls the confirmation output mode processing. That is, the controller 2 functions as the one-sheet output control section. The controller 2 controls the operations of the image forming section 4 and the transcriber 5, and makes them output images as the confirmation, for every sheet, according to various performing signals for the one-sheet output mode outputted from the operation input section 9.

Further, the controller 2 functions as the predetermined condition display control section. The controller 2 makes the display 8 display a selection screen capable of determining to go on to perform or change performing the processing of outputting the predetermined copies of sheets, by the operation input section 9, when finishing the confirmation output mode processing.

Further, the controller 2 functions as the page number display control section. The controller 2 makes the display 8 display the page numbers of image data of one copy consisting of a plurality of sheets, so that any one of the page numbers can be selected with the operation input section 9, in the one-sheet output mode.

Further, the controller 2 functions as the instruction display screen changing section. The controller 2 makes the display 8 display a selection screen capable of determining to go on to perform or change performing the processing of outputting the predetermined copies of papers, by the operation input section 9, even if the confirmation output mode processing for outputting one copy as confirmation does not end. Furthermore, the controller 2 functions as the executive section. The controller 2 performs the processing for going on to output the copies or the processing for changing outputting the copies, on the basis of the selection instruction.

Further, the controller 2 functions as the release confirmation display control section, in case of detecting the signal for performing the confirmation output mode processing in the staple mode. The controller 2 makes the display 8 display the confirmation display screen capable of determining whether the staple mode is released or not, by the operation input section 9. Furthermore, the controller 2 functions as the staple mode releasing section. The controller 2 outputs the release signal for releasing the staple mode to the transcriber 5, when detecting the signal for releasing the staple mode and performing the one-sheet output processing.

Various processing performed by the controller 2 will be explained with reference the following flow chart (shown in FIG. 2), in detail.

The image reader 3 comprises a scanner which is not shown in figures, at a lower position of a contact glass on which the papers are put, and makes the scanner read the images of the papers. The scanner consists of a light source, a lens, a CCD (Charge Coupled Device) or the like, which is not shown in figures. The scanner forms images on the basis of the reflection of the light by which the paper is scanned, the light emitted from the light source, and converts the image electrically. Thereby, the scanner reads the image of the paper. Then, the image reader 3 outputs the image read by the scanner, to the image forming section 4. Herein, the image is not limited to image data such as a figure, a photograph or the like. The image includes text data or the like, such as a character, a signal or the like.

The image forming section 4 performs the image processing such as a enlargement/reduction, a rotation, a positional change or the like, to the image read by the image reader 3, according to the instruction inputted through the operation input section 9. Then, the image forming section 4 outputs the image processed thereby, to the transcriber 5.

The transcriber 5 consists of a photosensitive drum, a toner, a paper output section, a feeder, or the like, which is not show in figures. The transcriber 5 makes the feeder feed the printing paper having the size in the direction inputted through the operation input section 4, and makes the photosensitive drum expose the electrostatic latent image of the image outputted from the image forming section 4 to the printing paper, according to the printing instruction outputted from the controller 2. Then, when the transcriber 5 transcribes and fixes the toner to the printing paper to which the electrostatic latent image is exposed, the transcriber 5 outputs the number of papers, instructed by the controller 2, from the outlet.

The storage 6 consists of a non-volatile semiconductor memory such as an EEPROM (Electrically Erasable Programmable Read-Only Memory) or the like. The storage 6 stores a system program which can be performed by the image forming apparatus 1, various processing programs corresponding to the system, data processed according to the various processing programs, or the like, thereon. The storage 6 stores the program in a format of program codes which can be read by the computer, thereon, and the controller 2 performs the operation according to the program codes. For example, the storage 6 may comprise the storage medium such as a CD-ROM or the like, which can be attached to and detached from the image forming apparatus 1.

The RAM (Random Access Memory) 7 forms a temporary storage area for storing the program read out of the storage 6, data inputted or outputted, a parameter or the like, according to various processing performed by the controller 2. The RAM 7 comprises an image storage section 7a. The image storage section 7a stores image data read by the image reader 3, temporarily.

The display 8 consists of a LCD (Liquid Crystal Display) or the like. The display 8 displays various types operation buttons or image states thereon, according to the display signal outputted from the controller 2.

Further, the display 8, for example, has the structure as one with the operation input section 9. The display 8 and the operation input section 9 are combined with each other, and function as the first operation display and the second operation display.

Figure 3:
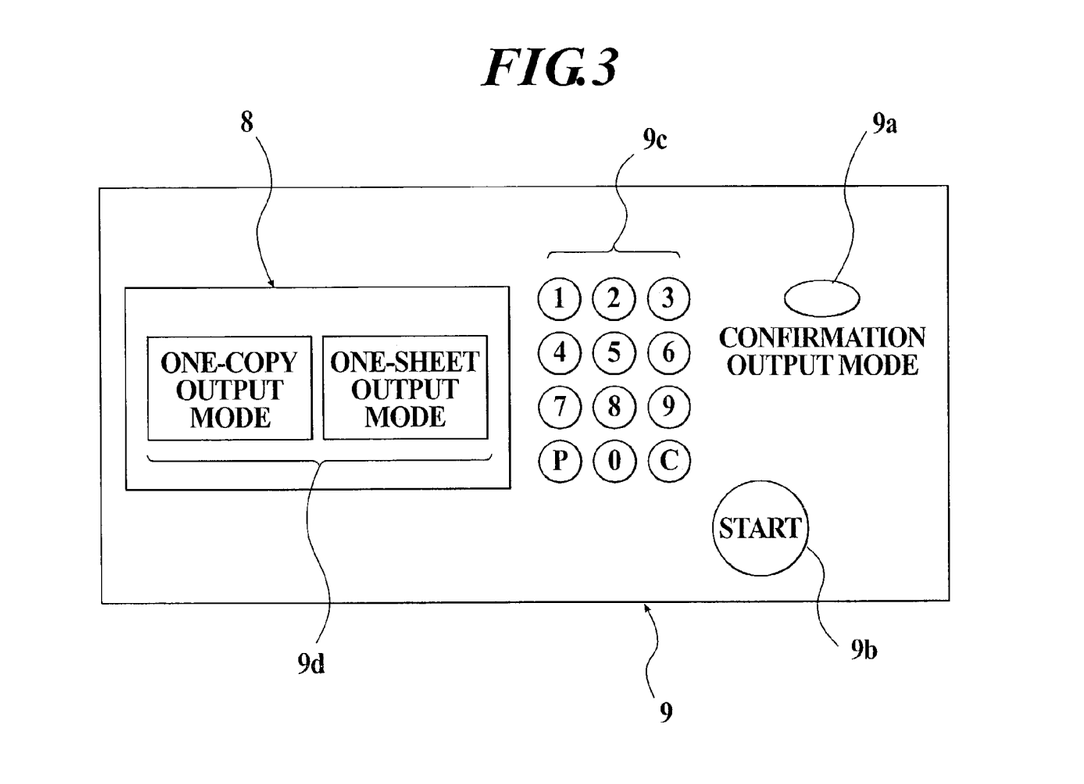
FIG. 3 is a view showing exemplary arrangement structures of a display 8 and an operation input section 9 shown in FIG. 1.

The operation input section 9 has the structure as one with the display 8 consisting of a pressure sensitive touch panel (resistance film pressure type) wherein transparent electrodes are arranged like a grid, or the like. Further, the whole operation input section 9 may consist of a touch panel or the like. It is preferable that the touch panel adopts a touch panel having the high permeability of the light, in terms of the visibility. The operation input section 9 detects the voltage value at X-Y coordinates of the pressure point pressed by a finger, an exclusive touch pen, or the like, on the touch panel, and outputs the position signal corresponding to the detected voltage value, to the controller 2, as the operation signal. Further, the operation input section 9 comprises various operation buttons such as numeral buttons, function buttons for changing various conditions, or the like. Specially, the operation input section 9 comprises a confirmation output mode button 9a (confirmation mode instructing section) for instructing to output the confirmation, and a start button 9b (output starting button) for starting outputting the confirmation, as shown in FIG. 3.

Further, when the user operates the operation input section 9, for example, in order to specify the output mode, the page number of the page to be outputted, the number of sheets to be outputted, or the like (for example, when the user pushes any one of output mode selection buttons 9d on the display 8, in order to specify the output mode), the operation input section 9 outputs the instruction signal corresponding to the instruction inputted by the user, to the controller 2, according to the image output processing. That is, the operation input section 9 has the function as the specifying section for specifying the output mode (the one-sheet output mode instructing section, the output mode selecting section, the staple mode selecting section), the page number of the page to be outputted, the number of sheets to be outputted.

The image forming apparatus 1 having the above-described function can specify various image outputs. Specifically, for example, the image forming apparatus 1 can specify the image quality such as a density, a contrast, a color balance or the like, the number of sheets to be outputted, the magnification such as the magnification, the reduction or the like, or the printing on both sides of the paper, or the like. Further, the image forming apparatus 1 can specify an operation (for example, a stapling position, a punching position, a middle folding, a Z-like folding or the like) of an optional apparatus (for example, a sorter, a finisher, a binding apparatus or the like) attached to the image forming apparatus 1, or the like.

As described above, the sections of the image forming apparatus 1 of the present invention are listed, and the characteristic functional structures of the sections have been explained. It is omitted to explain sections required in order that the image forming apparatus 1 realizes functions of a well-known general image forming apparatus such as a copying machine or the like. However, it is needless to say that each section has well-known functions or means other than the above-described functions.

Next, the operation of the confirmation output mode processing according to the present invention, will be explained with reference to a flow chart shown in FIG. 2, as follows.

First, with a view to performing the confirmation output mode processing according to the present invention, a user wants to copy a copy of a plurality of sheets (for example, ten sheets) and output a plurality of copies (for example, twenty copies) of sheets, by the image forming apparatus 1 of the present invention. Therefore, when the user puts the copy at a predetermined position of the image forming apparatus 1, the user pushes an image reading start button or the like of the operation input section 9 displayed on the display 8. As a result, all image data of the copy (for example, ten sheets) are read by the image reader 3 according to the instruction outputted from the controller 2, and stored in the image storage section 7a of the RAM 7. At the time, the user specifies the number of copies to be outputted (for example, twenty), the image condition (the density, the contrast, the magnification of the reduced/enlarged copy, the stapling or the like) or the like, through the operation input section 9.

As described above, in state the condition required to perform the confirmation output mode processing is specified in the image forming apparatus 1, first, the controller 2 of the image forming apparatus 1 determines whether the confirmation output mode button 9a is pushed by the user, and thereby the confirmation output mode is instructed or not, by detecting whether the signal for the confirmation output mode was inputted or not (Step S1).

Then, when determining that the conformation output mode button 9a is pushed, and thereby the confirmation output mode is instructed (Step S1; YES), the controller 2 performs the process in Step S2. On the other hand, when determining that the confirmation output mode is not instructed (Step S1; NO), the controller 2 instructs the image forming section 4 to perform the normal output processing. Therefore, the image forming section 4 performs the normal output processing of image data (Step S10).

Herein, according to the normal output processing of image data, for example, when the RAM 7 outputs the image data stored therein to the image forming section 4, the image forming section 4 forms the image of the image data in the image condition which is previously determined by the user. Then, when the start button 9b of the operation input section 9 is pressed by the user, the transcriber 5 exposes the electrostatic latent image of the image data to the printing paper of the size, in the direction specified by the controller 2, of the printing papers contained in the feeder which is not shown in figures, transcribes the toner, and outputs the paper from the paper output portion. The normal output processing of the image data is not limited to the above-described processing. Because the normal output processing is the same as a general image forming processing, it will be omitted to explain the normal output processing in detail.

Figure 4:
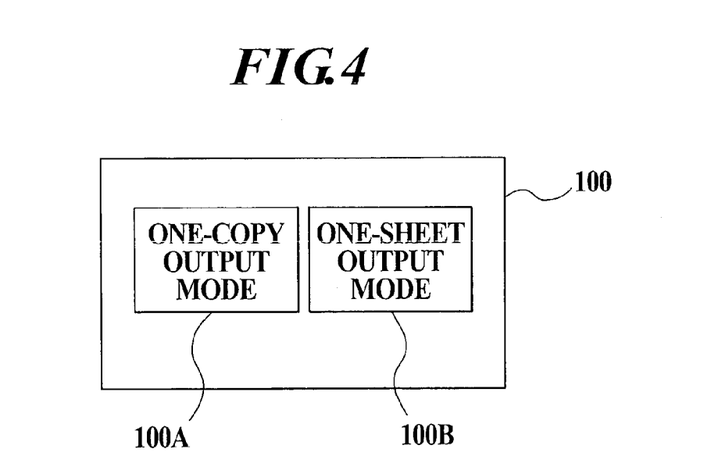
FIG. 4 is a view showing an exemplary display of a selection screen for selecting any one of a one-copy output mode and a one-sheet output mode, according to the confirmation output mode processing of the present invention.

Next, in Step S2, first, the controller 2 makes the display 8 display a screen 100 for selecting the output form in the confirmation output mode, as shown in FIG. 4. On the selection screen 100, the user presses a "one-copy output mode" button 100A or a "one-sheet output mode" button 100B, and selects the output form in the confirmation output mode. Herein, the one-copy output mode is a mode wherein the image forming apparatus 1 outputs all sheets (ten sheets) of one copy of a plurality of copies (twenty copies) which are previously specified, at the same time. The one-sheet output mode is a mode wherein the image forming apparatus 1 can output the sheets (ten sheets) of the one copy for every sheet.

Then, the controller 2 determines whether the "one-sheet output mode" button 100B was inputted or not (Step S2). When determining that the "one-sheet output mode" button 100B was inputted (Step S2; YES), the controller 2 performs the process in Step S3. On the other hand, when determining that the "one-sheet output mode" button 100B was not inputted (Step S2; NO), the controller 2 determines that the "one-copy output mode" button 100A was inputted, and makes the image forming section 4 and the transcriber 5 perform the one-copy output mode processing for outputting one copy of image data stored in the image storage section 7a of the RAM 7 (Step S9).

In Step S3, the controller 2 determines whether the staple mode is determined by the user through the operation input section 9, or not (Step S3). Then, when determining that the staple mode is determined (Step S3; YES), the controller 2 performs the process in Step S4. On the other hand, when determining that the staple mode is not determined (Step S3; NO), the controller 2 performs the process in Step S5.

Figure 5:
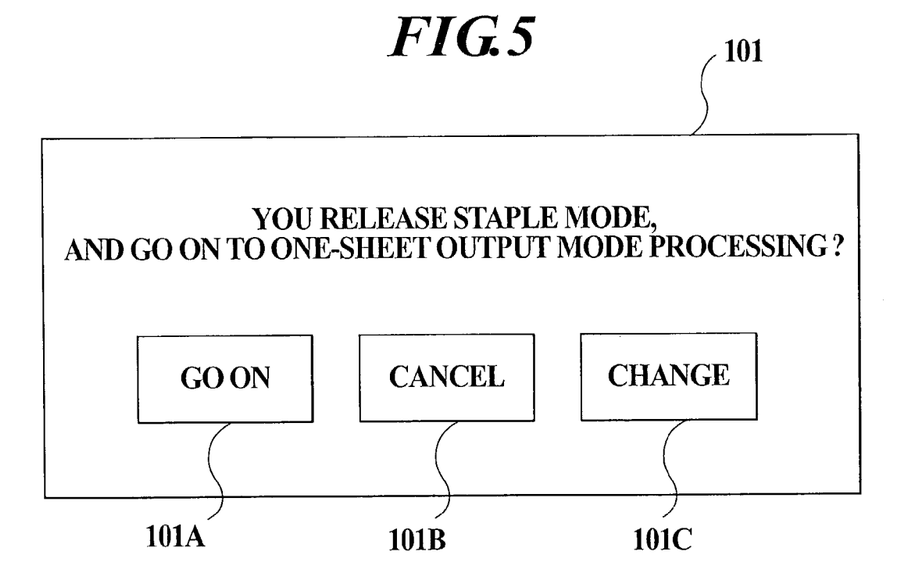
FIG. 5 is a view showing an exemplary display of a selection screen for determining a release from a staple mode, according to the confirmation output mode processing of the present invention.

In Step S4, the controller 2 makes the display 8 display a selection screen 101 for determining to release the determined staple mode and perform the one-sheet output mode processing, shown in FIG. 5. On the selection screen 101, a "GO ON" button 101A, a "CANCEL" button 101B, and "CHANGE" button 101C are displayed. The user selects and presses any button of them.

Then, the controller 2 determines whether the "GO ON" button 101A is pressed by the user or not. When determining that the "GO ON" button 101A is pressed by the user (Step S4; "GO ON"), the controller 2 outputs the instruction to release the determined staple mode while performing the one-sheet output mode processing, to the transcriber 5, and performs the process in Step S5. On the other hand, when determining that the "CANCEL" button 101B is pressed by the user (Step S4; "CANCEL"), the controller 2 finishes the confirmation output mode processing. Further, when determining that the "CHANGE" button 101C is pressed by the user (Step S4; "CHANGE"), the controller 2 goes back to the process in Step S2.

Figure 6:
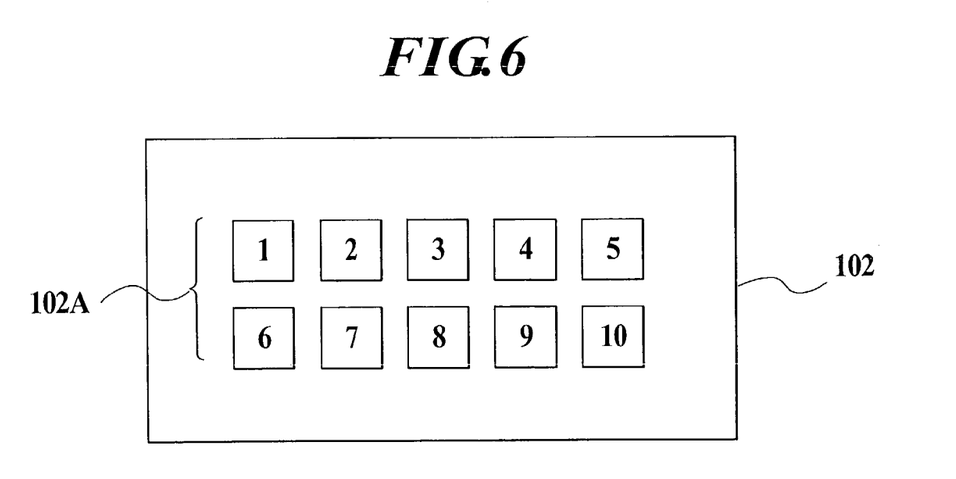
FIG. 6 is a view showing an exemplary display of a selection screen for specifying a page number of a page to be outputted for a confirmation.

Next, in order to perform the one-sheet output mode processing, in Step S5, the controller 2 makes the display 8 display an output page number selection screen 102 shown in FIG. 6 (Step S5). On the output page number selection screen 102, numbers corresponding to the number of pages of the image data stored in the image storage section 7a of the RAM 7 are displayed. The output page number selection screen 102 is a screen for selecting a page to be outputted by the user. For example, in case the copy consists of ten sheets, as shown in FIG. 6, number buttons 102A from 1 to 10 are displayed on the output page number selection screen 102. The number buttons 102A function as the selection button.

The user presses corresponding any one of the number buttons 102A, to the page to be outputted as the confirmation, and selects the output page, on the output page number selection screen 102. Then, when the user presses the start button 9b to start outputting the image, the controller 2 outputs the instruction to output the image of the specified page number to the image forming section 4 and the transcriber 5, according to the page selection signal and the output start signal inputted by the user, and makes them perform the one-sheet output mode processing (Step S6). The controller 2 may have a structure for starting outputting the image when the user presses any one of the number buttons 102A.

Further, the controller 2 may have a structure for outputting a plurality of pages selected by the user, when the user presses number buttons of the plurality of pages, selects the pages (for example, page 5, page 7, page 8 and so on) to be outputted, and presses the start button 9b, on the output page number selection screen 102. Furthermore, in the case, the controller 2 may have a structure capable of determining the order of outputting the plurality of pages.

Further, the controller 2 may output pages in page number order, for every sheet, when the user presses the start button 9b without selecting any page to be outputted. Furthermore, the controller 2 may have a structure for performing the one-sheet output processing without displaying the selection screen for the page numbers, that is, a structure for omitting selecting the page numbers.

Further, the controller 2 may have a structure wherein the user can select any of the selection output mode for specifying the page number the image of which is outputted and outputting the image of the specified page number, and the order output mode for outputting the images in page number order, for every sheet.

Next, the controller 2 determines whether all pages of images selected from one copy of images were output or not (Step S7). Then, when determining that selected all pages of images were output (Step S7; YES), the controller 2 finishes the operation of the confirmation output mode processing of the present invention.

On the other hand, when determining that all pages of images selected from one copy of images were not output (Step S7; NO), the controller 2 performs the process in Step S8, and determines whether the end signal for the one-sheet output mode was inputted by the user, or not (Step S8). Then, when determining that the end signal for the one-sheet output mode was inputted by the user (Step S8; YES), the controller 2 finishes the operation of the confirmation output mode processing. On the other hand, when not determining that the end signal for the one-sheet output mode was inputted (Step S8; NO), the controller 2 goes back to the process in Step S5.

Figure 2:
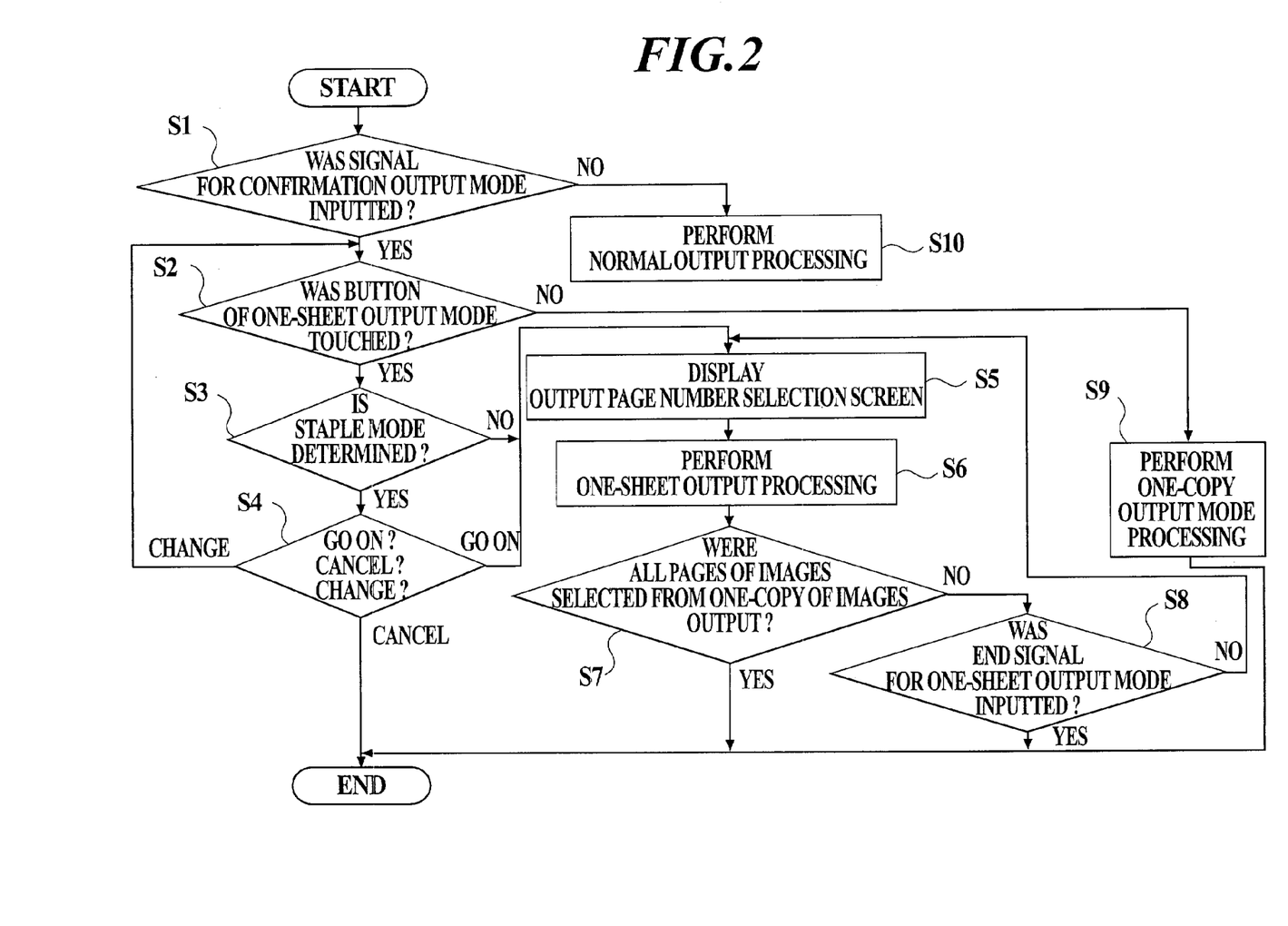
FIG. 2 is a flow chart for explaining an operation of a confirmation output mode processing performed by the image forming apparatus 1.

Although it has not been shown in the flow chart of FIG. 2, the controller 2 makes the display 8 display the output selection screen (which is not shown in figures) for determining to go on to, cancel, or change the processing for outputting a predetermined plurality of copies (for example, twenty copies), when finishing the confirmation output mode processing. Therefore, the controller 2 is in a state capable of going on to perform the normal output processing.

As described above, according to the confirmation output mode processing of the present embodiment, because it is possible to specify the page as the confirmation for every sheet and output the image of the page, in the conventional confirmation output mode for automatically outputting all images of one copy as the confirmation of the output state when outputting images of a plurality of copies, it is possible to reduce the waste of the papers. Further, because it is possible that the user saves trouble to specify to output the image for every sheet, or to pick out only the page to be outputted and output the image of the page, and it is possible to perform the processing for outputting the image of the desired page according to the easily operation, it is extremely convenient for the user.

The above-described embodiment is one example, and can be modified as the occasion may demand.

For example, the confirmation button 9a and the start button 9b may be operation buttons on a liquid crystal display, displayed on the display 8.

Further, it has been explained that the image data to be outputted are data read out of the copy as a paper medium or the like, by the image reader 3 as described above. However, for example, the image data may be received through a network such as the Internet or the like, and stored in the image storage section 7a. In the case, the image forming apparatus 1 comprises a modem, a terminal adapter or the like, and has a communication control function for controlling the communication in order to communicate with an external apparatus connected to the network through a communication line such as a telephone line, the ISDN, an exclusive line or the like.

As explained above, according to the image forming apparatus of the present invention, the following effect will be obtained.

According to the apparatus of the present invention, it is possible to instruct the one-sheet output mode for outputting one copy of images as the confirmation for every sheet, and to output the one copy of images as the confirmation for every sheet on the basis of the instructed one-sheet output mode. Consequently, because it is unnecessary to output all images of one copy as the confirmation, it is possible to reduce the waste of papers more.

Further, because one copy of images as the confirmation are outputted in page order, it is possible to confirm the images in page order, for every sheet.

Further, because the page selected from one copy of images as the confirmation is outputted for every sheet, it is possible to output the image of only the desired page.

Further, because the page numbers corresponding to the number of sheets of one copy of images to be outputted are displayed on the display, when the one-sheet output mode is instructed, it is possible that the user specifies the page to be outputted as the confirmation by selecting any one of the page numbers displayed on the display. Furthermore, because the page selected from the copy of images as confirmation is outputted, it is possible to output only the page which the user wants to confirm, and to provide the apparatus which the user can use easily, for the user.

Further, it is possible to select any one of the order output mode for outputting the copy of images as the confirmation in page order, and the selection output mode for outputting the page selected from the copy of images as the confirmation, and to output the copy of images as the confirmation, according to the selected output mode. Consequently, it is possible to provide the output format with the object of the user, for the user.

Further, the predetermined condition display screen for determining to go on to output or change outputting predetermined copies of images is displayed on the display, when all one copy of images as the confirmation are outputted, and the output of the predetermined copies of images are gone on or changed according to the predetermined condition. Consequently, it is possible to simplify the operation for determining the condition, performed by the user, after the copy of images as the confirmation are outputted.

Further, because the predetermined condition display screen can be displayed on the display, while outputting one copy of images as the confirmation, it is possible to stop outputting the one copy of images as the confirmation, and start the original output processing or the original changing processing quickly.

Further, because the copy of images as the confirmation are outputted for every sheet, even when the output start button is pushed, it is possible to instruct to output the copy of images as the confirmation when the user pushes the output start button. Consequently, it is possible to easily realize that the copy of images are outputted so as to be confirmed for every sheet.

Further, the staple mode is released, while being in the one-sheet output mode, or outputting the copy of images as the confirmation, when the staple mode and the one-sheet output mode are instructed by the user. Consequently, it is possible to prevent from stapling the copy for every sheet.

Further, because the operation for confirming that the staple mode is released is displayed on the display, it is possible to inform the user that the staple mode is released. Consequently, it is possible to provide the apparatus which the user can use easily, for the user.

The entire disclosure of Japanese Patent Application No. Tokugan 2002-031046 filed on Feb. 7, 2002 including specification, claims, drawings and summary are incorporated herein by reference in its entirety.

What is claimed is:

1. An image forming apparatus capable of outputting a plurality of copies formed based on inputted image data, wherein each copy includes a plurality of sheets, the apparatus comprising:
   a one-sheet output mode instructing section for instructing a one-sheet output mode in which the image forming apparatus outputs at least one sheet corresponding to at least one page number, which is individually selected from a plurality of page numbers of the plurality of sheets, as a confirmation before completely outputting the plurality of copies; and
   an output control section for outputting the at least one selected sheet corresponding to the at least one selected page number as the confirmation, when the one-sheet output mode is instructed by the one-sheet output mode instructing section.

2. The apparatus as claimed in claim 1, wherein the output control section outputs one copy of each of the plurality of sheets in page order as the confirmation, when none of the sheets are individually selected to be outputted.

3. The apparatus as claimed in claim 1, further comprising:
   an operation display; and
   a page number display control section for displaying the page numbers corresponding to the plurality of sheets on the operation display, when the one-sheet output mode is instructed by the one-sheet output mode instructing section,
   wherein the at least one selected sheet is selected by selecting the page number corresponding thereto from the page numbers displayed on the operation display.

4. The apparatus as claimed in claim 3, wherein the operation display comprises a liquid crystal display.

5. The apparatus as claimed in claim 1, further comprising:

an output mode selecting section for selecting one of: (i) an order output mode for outputting one copy of each of the plurality of sheets in page order as the confirmation, and (ii) the one-sheet output mode, said output mode selecting section comprising the one-sheet output mode instructing section;

wherein the output control section outputs one copy of each of the plurality of sheets in page order as the confirmation when the order output mode is selected by the output mode selecting section, and outputs the at least one selected sheet as the confirmation when the one-sheet output mode is selected by the output mode selecting section.

6. The apparatus as claimed in claim 1, further comprising:
  a display;
  a predetermined condition display control section for displaying, on the display, a predetermined condition display screen for setting whether to go on to output the plurality of copies or to change a processing for outputting the plurality of copies, when the output control section has outputted every sheet of the confirmation; and
  an executive section for going on to output the plurality of copies or to change the processing for outputting the plurality of copies in accordance with a setting made via the predetermined condition display screen.

7. The apparatus as claimed in claim 6, further comprising:
  an instruction display screen changing section for displaying the predetermined condition display screen on the display, while the output control section outputs the confirmation.

8. The apparatus as claimed in claim 1, further comprising:
  an output start button for starting outputting the plurality of copies,
  wherein the output control section outputs one copy of each of the plurality of sheets as the confirmation, even when the output start button is pushed.

9. The apparatus as claimed in claim 1, further comprising:
  a staple mode selecting section for setting a staple mode; and
  a staple mode releasing section for one of: (i) releasing the staple mode, and (ii) outputting one copy of each of the plurality of sheets as the confirmation, when the image forming apparatus is in the one-sheet output mode and when the staple mode is set by the staple mode selecting section.

10. The apparatus as claimed in claim 9, further comprising:
  an operation display; and
  a release confirmation display control section for displaying an instruction to perform an operation for confirming whether the staple mode is to be released, on the operation display, when the one-sheet output mode is instructed by the one-sheet output mode instructing section,
  wherein, when the operation is performed to confirm that the staple mode is to be released, the staple mode releasing section releases the staple mode in accordance with the operation.

11. The apparatus as claimed in claim 10, wherein operation display comprises a liquid crystal display.

12. An image forming method for outputting a plurality of copies formed based on inputted image data, wherein each copy includes a plurality of sheets, the method comprising:
  instructing a one-sheet output mode in which at least one sheet corresponding to at least one page number, which is individually selected from a plurality of page numbers of the plurality of sheets, is outputted as a confirmation before completely outputting the plurality of copies; and
  outputting the at least one selected sheet corresponding to the at least one selected page number as the confirmation, when the one-sheet output mode is instructed.

13. The method as claimed in claim 12, wherein, when none of the sheets are individually selected to be outputted, one copy of each of the plurality of sheets is outputted in page order as the confirmation in page order.

14. The method as claimed in claim 12, further comprising:
  displaying the page numbers corresponding to the plurality of sheets on an operation display, when the one-sheet output mode is instructed,
  wherein the at least one sheet is selected by selecting the page number corresponding thereto from the page numbers displayed on the operation display.

15. The method as claimed in claim 14, wherein the operation display comprises a liquid crystal display.

16. The method as claimed in claim 12, further comprising:
  displaying, on a display, a predetermined condition display screen for determining whether to go on to output the plurality of copies or to change a processing for outputting the plurality of copies, when every sheet of the confirmation has been outputted; and
  going on to output the plurality of copies or changing the processing for outputting the plurality of copies in accordance with a determination made via the predetermined condition display screen.

17. The method as claimed in claim 16, further comprising:
  displaying the predetermined condition display screen on the display, while outputting the confirmation.

18. The method as claimed in claim 12, wherein one copy of each of the plurality of sheets is outputted as the confirmation, even when an output start button, for starting outputting of the plurality of copies, is pushed.

19. The method as claimed in claim 12, further comprising:
  setting a staple mode; and
  one of: (i) releasing the staple mode, and (ii) outputting one copy of each of the plurality of sheets as the confirmation, when the one-sheet output mode is instructed, and when the staple mode is set.

20. The method as claimed in claim 19, further comprising:
  displaying, on an operation display, an instruction to perform an operation for confirming whether the staple mode is to be released, when the one-sheet output mode is instructed,
  wherein, when the operation is performed to confirm that the staple mode is to be released, the staple mode is released in accordance with the operation.

21. The method as claimed in claim 20, wherein the operation display comprises a liquid crystal display.

* * * * *